United States Patent [19]

Hood

[11] 3,932,697

[45] Jan. 13, 1976

[54] ROPE TERMINATIONS AND METHODS AND APPARATUS FOR FABRICATING THE SAME

[75] Inventor: Henry Alexander Hood, Moorestown, N.J.

[73] Assignee: Wall Industries, Inc., Beverly, N.J.

[22] Filed: July 29, 1974

[21] Appl. No.: 492,721

[52] U.S. Cl. .................. 174/79; 16/108; 24/122.6; 29/461; 403/209; 403/210; 403/213; 403/269
[51] Int. Cl.$^2$ ..................... H02G 15/02; H02G 1/14; F16G 11/00
[58] Field of Search ................. 174/79, 89; 16/108; 24/115 R, 115 K, 122.3, 122.6; 29/461; 403/185, 206, 209, 210, 211, 212, 213, 269, 275, 291, 300

[56] References Cited
UNITED STATES PATENTS

| | | | |
|---|---|---|---|
| 741,605 | 10/1903 | Young | 24/122.6 X |
| 1,246,964 | 11/1917 | Lowe | 174/89 X |
| 1,686,288 | 10/1928 | Meals | 403/210 X |
| 2,198,093 | 4/1940 | Smythe | 174/79 |
| 3,226,470 | 12/1965 | Bryant | 174/79 |
| 3,328,229 | 6/1967 | Windecker | 403/275 X |

*Primary Examiner*—Laramie E. Askin
*Attorney, Agent, or Firm*—Howson and Howson

[57] ABSTRACT

Fittings are provided for use in terminating parallel yarn ropes containing one or more electrical conductors, and methods are disclosed for securing the fittings to the ropes to afford separation of the conductors from the rope and connection to electrical apparatus. One fitting has a frusto-conical body portion providing a tapered peripheral surface with an axial bore and a bail extending beyond the base of the body. The rope yarns are inserted into the bore at the narrow end of the fitting and divided into two pairs of bundles with each pair being splayed outward diametrically of the bore and returned along the outside of the fitting for wrapping helically in opposite directions for a predetermined distance about the periphery of the rope. The ends of the bundles are secured to the rope, so that when tension is applied between the bail and the rope, the wrapped bundles grip the outside of the fitting securely to mount the fitting to the rope. In an alternate embodiment, the fitting includes a thimble having a narrow end located adjacent the end of the rope, and the rope yarns are divided into two bundles which extend in opposite directions in the channel around the thimble and which are wrapped helically about the rope similarly to the first embodiment. Both fittings and a short section of the rope adjacent thereto are encapsulated by a mass of polyurethane which rigidifies and protects the termination.

9 Claims, 8 Drawing Figures

U.S. Patent  Jan. 13, 1976  Sheet 1 of 2  3,932,697
FIG. 1
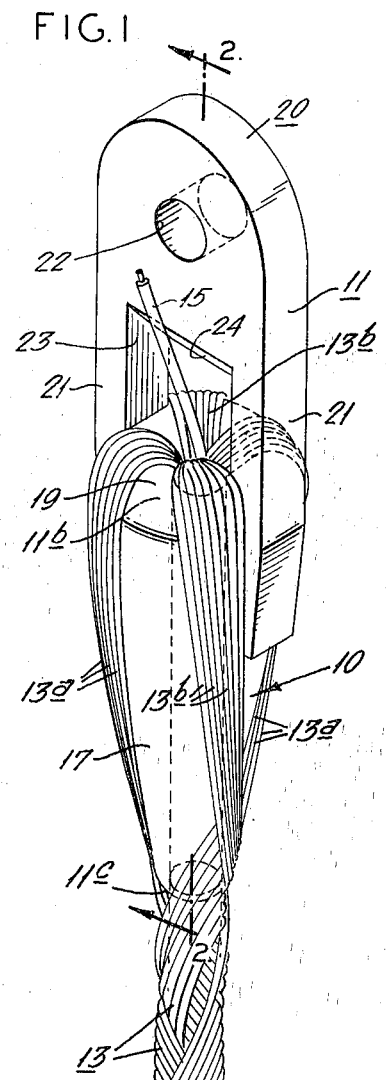
FIG. 2
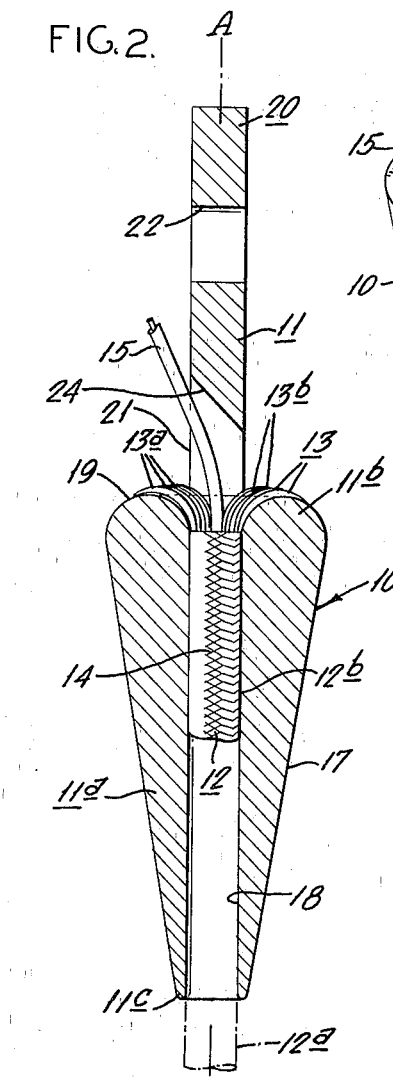
FIG. 4
POLYURETHANE
FIG. 3
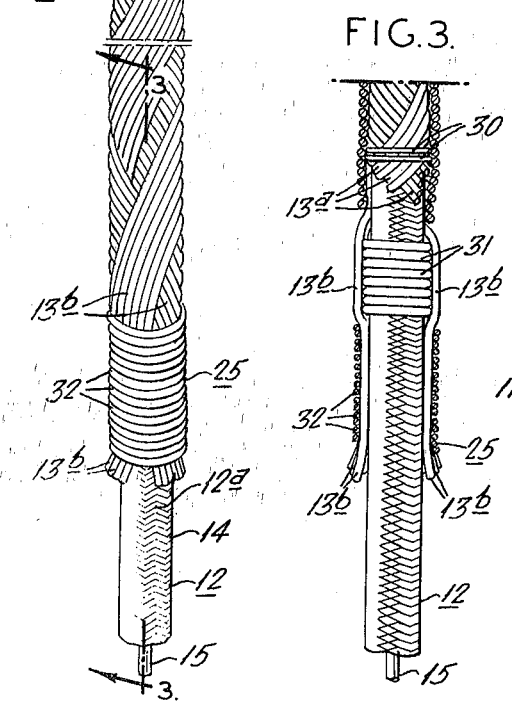
FIG. 5
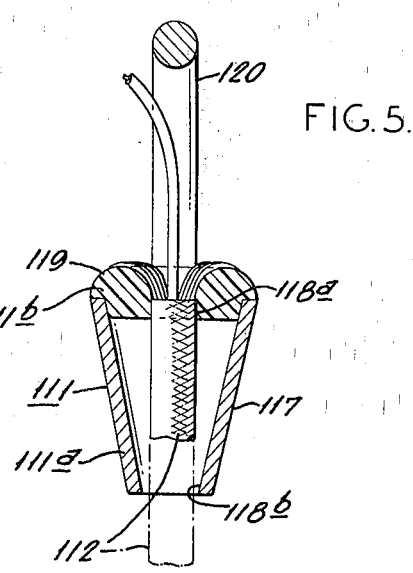

ROPE TERMINATIONS AND METHODS AND APPARATUS FOR FABRICATING THE SAME

The present invention relates to structures for connecting the ends of ropes and/or cables to loads, and more particularly, the present invention relates to methods and apparatus for terminating ropes having electrical conductors carried therein.

At present, there is on the market a high-strength parallel yarn rope sold under the trademark Uniline by Wall Industries, Inc. of Beverly, N. J. The rope employs a plurality of rope yarns of man-made fibers disposed in parallel relation inside a braided protective jacket. Although the strength of the rope is at a maximum when the yarns are of high-strength fibers such as aramid sold under the trademark Kevlar, it is difficult to connect the rope to a load in such a manner as to ensure complete transfer of the rope tension of the load. If the connection between the end of the rope and the load is not as strong as the rope itself, the rope is not capable of being used with maximum efficiency and safety.

In certain applications, the aforementioned rope may be provided with one or more electrical conductors contained among the rope yarns. The conductors are customarily separated from the yarns at one or both ends of the rope for connection to electrical apparatus. Since it is important for the conductors to be separated from the rope and connected to the apparatus in a substantially stress-free manner, it should be apparent that a termination which affords such connection is highly desirable.

Various types of termination fittings are known in the art for securing an end of a cable to a load. Examples of such fittings are disclosed in the following U.S. Pat. Nos.: 3,122,806; 1,246,964; 2,198,093; 3,551,960; and 3,551,959. Although each of these patented structures may function satisfactorily for its intended purpose, none is particularly suited for use in terminating a parallel yarn rope or cable containing electrical conductors.

Although the termination disclosed in U.S. Pat. No. 1,246,964 terminates a cable carrying an electrical conductor, it employs a so-called compression principle for transferring the tension in the cable to a load. Such a termination, however, is limited to use in conjunction with steel or other metal cables, because of the need for the cable strands to have high compressive strengths. It could not be employed satisfactorily to terminate ropes or cables made of man-made fibers, because of the relatively-low compressive strengths which these fibers possess. Moreover, the patented terminations are relatively complex. Hence, they are not capable of being fabricated readily in the field without special tools.

With the foregoing in mind, it is a primary object of the present invention to provide a novel termination for a rope.

It is another object of the present invention to provide an improved termination for effecting a high-strength and efficient connection between a parallel yarn rope and a load.

As another object, the present invention provides unique termination fittings for use in terminating a rope having one or more electrical conductors associated therewith.

It is a further object of the present invention to provide relatively simple methods for terminating a rope with a minimum of labor and special equipment, thereby affording ready fabrication in the field.

As a further object, the present invention provides terminations which enable conductors contained within a rope to be separated therefrom and connected to electrical apparatus in a substantially stress-free condition.

More specifically, the present invention provides rope terminations, termination fittings for use in effecting the terminations, and methods for securing the fittings to lengths of rope. The terminations are particularly suited for use with ropes having electrical conductors to afford separation of the conductors from the rope and securement to electrical apparatus. In fabricating terminations using the fittings and methods of the present invention, the parallel yarns composing the core of the rope are divided into at least a pair of bundles which are wrapped about the fitting in a prearranged manner before being wrapped helically in opposite directions about the periphery of the rope for a predetermined distance. The ends of the bundles are securely fastened to the rope, so that when tension is applied between the rope and the fitting, the wrapped bundles grip the rope firmly to secure the fitting thereto. One of the disclosed fittings has a frusto-conical configuration with an axial bore and a curved base surface connecting the bore with the peripheral surface of the fitting. With this fitting, the rope yarns are divided into one, and preferably two, pairs of bundles which are inserted axially in the bore at the narrow end of the fitting and splayed diametrically outward about the curved base before being returned along the outside of the fitting and wrapped helically in opposite directions about the rope. Another disclosed fitting is provided by an outwardly-open channel member disposed in a loop. The loop has a narrow end mounting a tubular sleeve which receives the conductors, and the rope yarns are divided into a pair of bundles which extend in opposite directions around the loop in the channel. The bundles are wrapped helically in opposite directions about the rope as with the aforementioned fitting. Each fitting has securing means such as an eye or bail to connect the same to a load.

These and other objects, features and advantages of the present invention should become apparent from the following description when taken in conjunction with the accompanying drawings in which:

FIG. 1 is a perspective view of a rope termination embodying the present invention;

FIGS. 2 and 3 are longitudinal sectional views taken along lines 2—2 and 3—3, respectively, of FIG. 1;

FIG. 4 is a perspective view in reduced scale of the rope termination of FIG. 1 with a protective boot thereon;

FIG. 5 is a sectional view similar to FIG. 2 but of a modified embodiment of the present invention;

Figure 6:
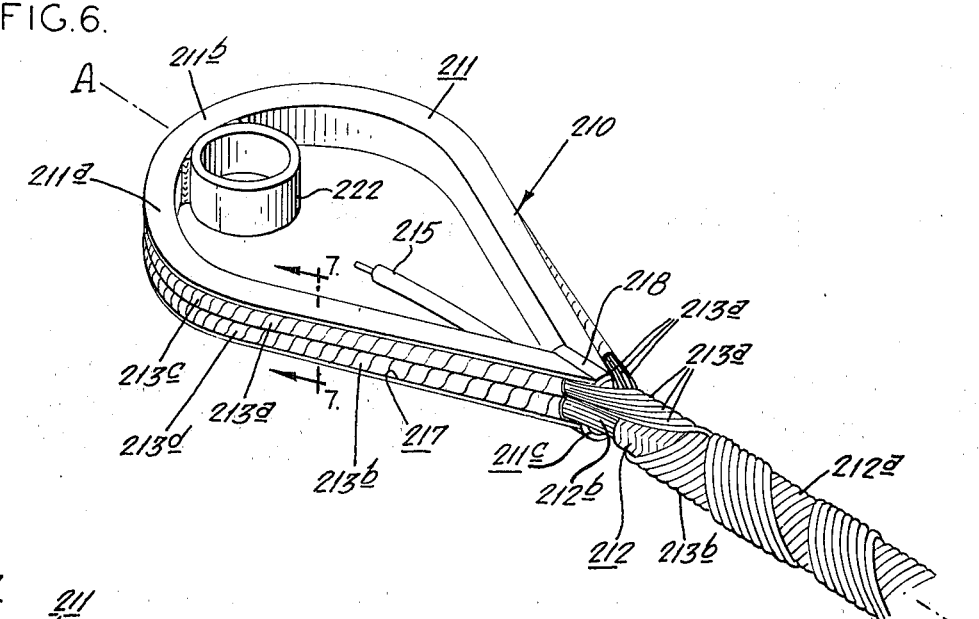
FIG. 6 is a perspective view of another modified embodiment of the present invention.
Figure 7:
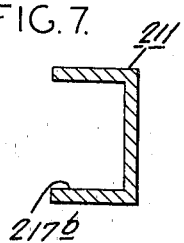
FIG. 7 is a sectional view taken along lines 7—7 of FIG. 6.
Figure 8:
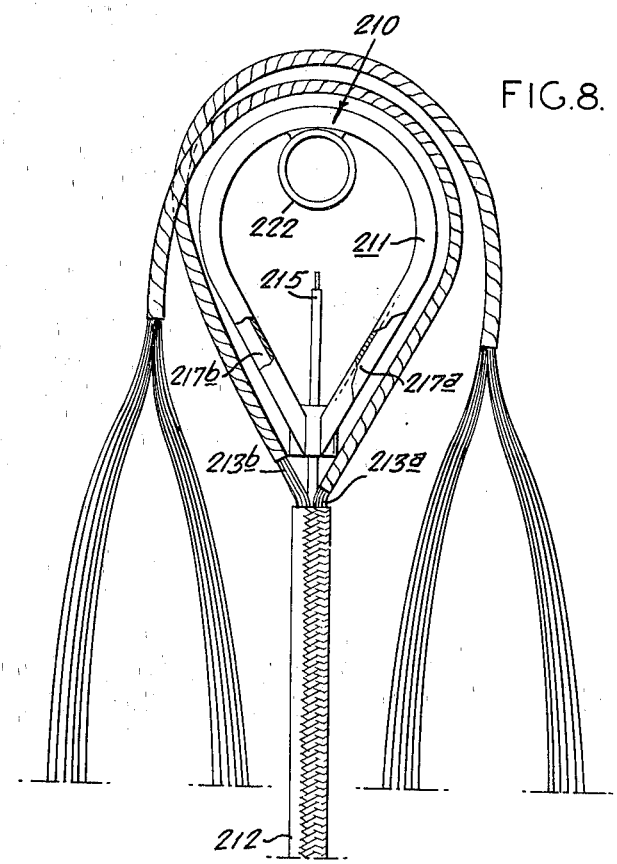
FIG. 8 is a plan view illustrating the termination of FIG. 6 before the rope yarns are wrapped about the fitting.

Referring now to the drawings, FIG. 1 illustrates a rope termination 10 embodying the present invention. As best seen therein, the termination 10 comprises a termination fitting 11 and a length of rope 12 fastened to the fitting 11. As best seen in FIG. 2, the rope 12 has a main section 12a and an end section 12b, and the illustrated rope 12 is composed of a plurality of rope yarns 13,13 disposed parallel with one another inside a braided jacket 14. A rope having this construction is sold by Wall Industries, Inc. of Beverly, N. J. under the registered trademark Uniline, and for a more detailed description of such a rope and its method of manufacture, reference is made to U.S. patent application Ser. No. 434,627 filed on Jan. 18, 1974, now U.S. Pat. No. 3,911,785, owned by the assignee of the present application.

According to the present invention, the termination 10 is designed to provide a secure connection between the rope 12 and a load. The termination 10 is particularly suited for use in conjunction with a rope, such as the illustrated rope, containing one or more electrical conductors therein, such as the conductor 15. For instance, the termination 10 permits substantial tension to be applied between the rope 12 and the fitting 11 while permitting the conductor 15 to be separated from the core yarns 13,13 and connected to electrical apparatus in a stress-free manner.

As best seen in FIG. 2, the fitting 11 has a frusto-conical body 11a which is symmetrical about a longitudinal axis A disposed coaxial with the longitudinal axis of the rope 12. The body 11a has a base 11b and an apex or inner end 11c with a peripheral surface 17 tapering outwardly from the apex 11c and toward the base 11b. The fitting 11 has a bore 18 which extends axially between the inner end 11c and the base 11b and which is sized to receive a short length of the main section 12a of the rope 12. The base 11b of the fitting has a curved surface 19 which provides a smooth transition surface between the bore 18 and the tapered outer surface 17 of the body 11a.

As best seen in FIG. 1, securing means, in the present instance a bail 20, is provided to fasten the body of the fitting 11 to an anchoring device. In the illustrated embodiment, the bail 20 is provided by a plate having depending bifurcations 21,21 which are fastened to the peripheral surface 17 of the body 11a at diametrically-spaced locations. The bail 20 has a hole or eye 22 adapted to receive a shackle pin or like fastener. In addition, the bail 20 has an inclined surface 24 which confronts the bore 18 and defines one edge of an aperture 23 located between the bifurcations. The surface 24 prevents any sharp edges from contacting the conductor 15 and possibly abrading the same. Preferably, the overall diameter of the base 11b corresponds to about 5 rope diameters, and the radius of curvature of the surface 19 corresponds to about 1 rope diameter. In addition, it is preferable for the body 11a of the fitting to have a length corresponding to about 10 rope diameters measured between the upper extremity of the curved base surface 19 and the inner end or apex 11c.

The fitting 11 is fastened to the rope 12 in a novel manner which provides an efficient high-strength connection capable of being fabricated in the field with a minimum of labor and without special equipment. To this end, the rope 12 is fastened to the fitting 11 by arranging the rope yarns 13,13 about the fitting 11 and the main section 12a of the rope 12 in such a manner as to cause the yarns 13,13 to grip the periphery of the rope 12 firmly when the rope is tensioned. As best seen in FIG. 1, the rope yarns 13,13 are divided into one, and preferably two pairs of bundles, each having substantially the same number of yarns. One pair of bundles is designated with the numeral 13a,13a and the other pair is designated with the numeral 13b,13b. In the illustrated embodiment, one bundle 13a and one bundle 13b of each pair is disposed to one side of the bifurcations 21,21, and one bundle of each pair is similarly disposed on the other side of the bifurcations.

The bundles 13a,13a are splayed diametrically and radially outward around the curved surface 19 at the base 11b of the body 11a, and they extend axially rearward or inward along the tapered surface 17 toward the inner end or apex 11c of the body of the fitting 11. The bundles 13a,13a are thereafter wrapped helically in opposite directions about the periphery of the main section 12a of the rope 12. For instance, the bundle 13a in the foreground of FIG. 1 is wrapped in the counter-clockwise direction (looking downward in FIG. 1) about the rope 12, and the other bundle 13a is wrapped in the clockwise direction over its companion bundle so that one bundle overlies the other. Both bundles are wrapped for a predetermined distance along the length of the rope. The bundles 13b, 13b in the other pair are wrapped similarly about the bundles 13a, 13a of the first-mentioned pair.

The ends of the bundles are secured to the outer periphery of the rope 12 by means of tape or twine lashing 25 wrapped several times around the ends of the bundles and an adjacent section of the rope 12, such as illustrated in FIG. 3, and in a manner described more fully hereinafter. Thus, when tension is applied downwardly to the rope 12 and upwardly to the fitting 11, the wrapped bundles 13a and 13b cooperate to grip the periphery of the rope 12 to fasten the fitting 11 securely thereto. Since the same yarns 13,13 which form the core of the rope 12 are employed to fasten the fitting, a high-strength connection is provided.

In order to protect the yarn bundles 13a and 13b from damage, and to rigidify the entire termination, the body 11a of the fitting and a section of the rope 12 adjacent the fitting is encapsulated by a conical boot of polyurethane material 26 (FIG. 4). The bail 20 protrudes from the upper end of the boot 26 and is exposed, and the conductor 15 extends away from the boot 26 for connection to electrical apparatus. The boot 26 prevents the fitting from pivoting laterally relative to the rope while protecting the rope yarns from damage.

A modified fitting 111 is illustrated in FIG. 5. In this embodiment, the fitting 111 is provided by a hollow conical member 111a having a tapered peripheral surface 117. A curved surface 119 is provided by an insert 111b, preferably of a hard plastic material, which is telescopically received within the outer end of the tubular member 111a. The insert 111b and the tubular member 111a have aligned bores 118a and 118b which receive a length of rope 112. In this embodiment, the yarn bundles are arranged about the fitting 111 in a manner similar to the manner in which the bundles are arranged in the embodiment of FIG. 1, and the bundles are similarly wrapped and secured to the rope 112. The securing means in this embodiment is provided by an inverted U-shaped bail 120 secured to the body 117 in a manner similar to the bail 20 in FIG. 1.

As best seen in FIG. 6, a modified rope termination 210 which embodies the present invention is provided. The modified termination 210 includes a fitting 211 connected to a rope 212 having a main section 212a and an end section 212b. As in the aforementioned embodiments, the fitting 211 is secured to the rope 212 in a manner which provides a strong and secure connection between the rope 212 and a load.

In this embodiment, the rope 212 is a parallel yarn rope having a plurality of rope yarns 213,213 and a conductor 215. The fitting 211 is provided by a channel member which is disposed in the form of a planar loop having an outwardly-open channel 217 around its periphery and being symmetrical with respect to an axis A. The fitting 211 has diametrically-opposed surfaces 217a and 217b which taper inwardly toward the axis A at the inner end 211c of the fitting. A sleeve 218 is mounted at the inner end 211c and is disposed coaxial with the axis A. The sleeve 218 has a bore which is sized to receive the conductor 215, and preferably, the sleeve 218 is provided with a tubular insert of nylon or other relatively soft material to protect the same against damage.

In order to protect the conductor 215 against inadvertant severance, such as if the other end of the rope 212 were connected to a moving load, the fitting 211 has a tubular member 222 welded to the inside of the channel member 211a at its outer end 211b. The tubular member 222 has its axis disposed normal to the plane of the loop and provides an eye which may be slid onto a shackle pin (not shown) for mounting the fitting 211 for pivotal movement while preventing the shackle pin from engaging the conductor 215 as the fitting 211 pivots.

In this embodiment, the fitting 211 is fastened to the rope 212 by wrapping the rope yarns 213,213 about the main section 212a of the rope 212 in a manner similar to the embodiment of FIG. 1. To this end, the rope yarns 213,213 are divided into a pair of bundles 213a and 213b which are wrapped for a short distance with a reinforced tape or twine as indicated at 213c and 213d to protect the yarns when placed in the channel member 217. The ends of each of the bundles 213a and 213b beyond the wrapped sections 213c and 213d are then further divided into a pair of bundles which are wrapped about the rope as in FIG. 1. It is noted that the conductor 215 is inserted in the sleeve 218 and the rope yarns are splayed about the inner end 211c of the fitting 211 before the yarns are wrapped about the rope.

If desired, a satisfactory termination may be provided by wrapping a single pair of yarn bundles about the rope 212, such as indicated in FIG. 6. To this end, one of the pair of bundles 213a is extended counterclockwise about the channel member 211 and is disposed in the upper portion of the channel 217 before being wrapped helically in a clockwise direction (looking leftward in FIG. 6) about the main portion 212a of the rope 212. The other one of the bundles 213b is disposed alongside of the first bundle 213a in the channel 217; however, this bundle 213b extends in the opposite or clockwise direction about the periphery of the channel member 211a before being wrapped helically in the opposite or counterclockwise direction about the main portion 212a of the rope 212. As in the aforementioned embodiments, the bundles 213a and 213b are wrapped for a predetermined distance along the length of the main portion 212a of the rope 212, and the ends of the bundles are secured to the outside of the rope 212 as by a twine lashing, taping, or the like. Preferably, the termination 210 is encapsulated by a layer of polyurethane such as illustrated in FIG. 4.

With this structure, tension applied rightward on the rope 212 and leftward on the fitting 211 causes the helically-wrapped portions of the rope yarns 213,213 to grip the outside of the rope 212 firmly to mount the fitting 211 securely to the end of the rope 212. Thus, the conductor 215 may be separated from the core yarns 213,213 and connected to electrical apparatus in a substantially stress-free manner.

In order to insure that the terminations are efficient, with their strength being substantially equal to that of the rope, it is desirable for certain precautions to be taken in fabricating the terminations. For instance, the bundles of core yarns should be wrapped about the main portion of the rope for a predetermined distance in a predetermined manner. The distance and arrangement of wraps depend upon the material of the rope yarn fibers, as described hereinafter.

When the yarns are of nylon or polyester fibers, the jacket of the rope is removed for a distance of about 85 rope diameters from its end. The predetermined distance from the inner end of the termination fitting is marked off on the main portion of the rope prior to wrapping the core yarn bundles about the rope. For nylon or polyester yarns, 9 marks are placed on the rope at spaced intervals with the first mark being placed at the location of the inner end of the fitting. The first 6 marks are spaced from one another distances equal to 6 times the rope diameter and the last 3 spaces are spaced from one another from 3–4 times the rope diameter. Afterward, both pairs of yarn bundles are wrapped helically about the rope in such a manner that the oppositely-wrapped bundles intersect one another at the location of the marks. When the yarns are of Kevlar fibers, the marks are placed on the rope at different intervals, due to the different strength and elongation characteristics of Kevlar. For instance, the marks are placed at 16 intervals, the first 2 intervals being spaced apart about 9 rope diameters, the next 12 marks being spaced apart about 6 rope diameters, and the last 2 marks being spaced apart about 4 rope diameters.

In addition to the manner in which the yarn bundles are wrapped, it is important for their ends to be securely fastened to the rope. To this end, the ends of one of the pair of bundles, such as the pair 13b (FIG. 3) are cut longer than the other pair 13a. The ends of the pair 13a, after being wrapped, are tied by a twine 30, and a short length of the rope is lashed by a twine 31 beyond the ends of the pair 13a. The longer pair 13b are then wrapped over the lashing 31, and a length of twine 32 is lashed around the longer pair 13b. Afterward, the entire length of the wrapped bundles is coated with neoprene, wrapped with a nylon twine, and again coated. If desired, shrink tubing could be utilized as a protective cover. In order to illustrate the helical wraps, the outer lashing has not been illustrated in FIG. 1. With this technique, the termination develops substantially the full strength of the rope and efficiently transmits the tension in the rope to the load connected to the fitting.

In view of the foregoing, it should be apparent that the present invention now provides improved terminations and termination fittings which are particularly useful in conjunction with parallel yarn ropes containing electrical conductors. The present invention also provides improved methods for fastening termination fittings to parallel yarn ropes. Both the methods and apparatus of the present invention cooperate to permit parallel yarn ropes to be terminated efficiently and in a manner requiring a minimum of labor and/or special equipment.

While preferred embodiments of the present invention have been described in detail, various modifications, alterations and changes may be made without departing from the spirit and scope of the present invention as defined in the appended claims.

I claim:

1. A termination of a length of rope having a plurality of rope yarns, comprising:
   a termination fitting having an inner end,
   fastening means carried by said fitting remote from said inner end,
   said fitting having a peripheral surface with a curved portion remote from said inner end and diametrically-opposed portions tapering outwardly from said inner end,
   said rope having a main section with said yarns closely associated with one another and an end section with said yarns separated into at least a pair of bundles,
   said bundles extending outwardly around the curved portion of said peripheral surface and returning along said diametrically-opposed portions of said peripheral surface,
   one of said pair of bundles being wrapped helically in one direction about the main section of the rope and the other of said bundles being wrapped helically in the opposite direction about said one bundle,
   said bundles being wrapped for a predetermined distance along said main section of the rope and having ends, and
   means securing said ends to the main section of said rope,
   whereby the application of tension between the main section of the rope and the fastening means of the fitting causes the wrapped bundles to grip the rope for securely mounting the fitting thereto.

2. A termination according to claim 1 wherein said rope includes at least one electrical conductor among said rope yarns, said yarns being splayed about said termination fitting and said conductor being separated from said splayed yarns and extended away from said fitting.

3. A termination according to claim 2 including a rigid boot surrounding said tapered surfaces and said main section of said rope adjacent said fitting to protect said yarns and to rigidify the termination.

4. A termination according to claim 3 wherein said fitting has an axial bore receiving said rope and a frusto-conical shape with a base remote from said inner end, said curved surface portion being provided on said base and connecting said bore and the tapered periphery of said fitting, said rope yarns splaying radially-outward about said curved base surface and inwardly along said tapered periphery of the fitting.

5. A termination according to claim 4 wherein said fitting includes a bail extending axially beyond said curved base to provide said fastening means, and wherein said yarns are divided into at least another pair of bundles arranged about the periphery of said fitting and wrapped helically about the main portion of the rope similarly to said first-mentioned pair.

6. A rope termination according to claim 3 including an outwardly-open channel member disposed in the form of a loop to provide said tapered and curved surfaces engaged by said yarn bundles, one of said yarn bundles extending in one direction around said loop and the other of said bundles extending in the other direction around said loop alongside said one bundle.

7. A rope termination according to claim 6 including an axially-extending sleeve member mounted at the inner end of said fitting, said yarns splaying adjacent said inner end of said fitting and said conductor extending through said sleeve member.

8. A method of terminating a rope composed of a plurality of yarns, comprising the steps of:
   associating with one end of the rope a fitting having a frusto-conical peripheral surface with a base and an axial bore,
   disposing the fitting with its narrow end toward the end of the rope,
   separating the rope yarns into at least one pair of bundles,
   inserting the bundles axially into the bore at the narrow end of the fitting,
   splaying the bundles diametrically outward around the base of the fitting,
   disposing the bundles axially along opposite sides of the peripheral surface,
   wrapping one bundle helically in one direction about the rope inwardly of the fitting for a predetermined distance,
   wrapping the other bundle helically in the opposite direction about said one bundle for said distance, and
   securing the ends of said bundles to said rope.

9. A method of terminating a rope composed of a plurality of yarns, comprising the steps of:
   associating with one end of the rope a fitting having an outwardly-open channel disposed in the form of a loop having a narrow end,
   disposing the narrow end of the loop adjacent the end of the rope,
   separating the rope yarns into at least one pair of bundles,
   extending one bundle in one direction around said loop in said channel,
   extending the other bundle in the other direction around said loop in said channel,
   wrapping one bundle helically about the rope in one direction for a predetermined distance,
   wrapping the other bundle helically about the rope in the other direction for said distance, and
   securing the ends of the bundles to the rope.

* * * * *